(12) United States Patent
Potter

(10) Patent No.: US 7,786,610 B2
(45) Date of Patent: Aug. 31, 2010

(54) FUNNELED WIND TURBINE AIRCRAFT

(76) Inventor: Lynn Potter, 544 E. Williams St., Barstow, CA (US) 92311

(*) Notice: Subject to any disclaimer, the term of this patent is extended or adjusted under 35 U.S.C. 154(b) by 129 days.

(21) Appl. No.: 12/124,573

(22) Filed: May 21, 2008

(65) Prior Publication Data

US 2008/0290665 A1  Nov. 27, 2008

Related U.S. Application Data

(60) Provisional application No. 60/939,604, filed on May 22, 2007.

(51) Int. Cl.
*F03D 9/00* (2006.01)
(52) U.S. Cl. .......................... 290/55; 415/7
(58) Field of Classification Search .................. 290/55, 290/44; 415/7
See application file for complete search history.

(56) References Cited

U.S. PATENT DOCUMENTS

| | | | | | |
|---|---|---|---|---|---|
| 1,495,036 | A | * | 5/1924 | Carlton ........................ | 244/58 |
| 3,883,750 | A | * | 5/1975 | Uzzell, Jr. .................... | 290/55 |
| 4,073,516 | A | * | 2/1978 | Kling .......................... | 290/55 |
| 4,132,499 | A | * | 1/1979 | Igra ......................... | 415/210.1 |
| 4,166,596 | A | * | 9/1979 | Mouton et al. ................ | 244/30 |
| 4,207,026 | A | * | 6/1980 | Kushto ......................... | 416/84 |
| 4,219,303 | A | * | 8/1980 | Mouton et al. ................. | 415/7 |
| 4,285,481 | A | * | 8/1981 | Biscomb ...................... | 244/33 |
| 4,491,739 | A | * | 1/1985 | Watson ........................ | 290/44 |
| 4,659,940 | A | * | 4/1987 | Shepard ....................... | 290/55 |
| 6,382,904 | B1 | * | 5/2002 | Orlov et al. .................. | 415/4.5 |
| 2006/0091678 | A1 | * | 5/2006 | Macedo ........................ | 290/55 |
| 2007/0013196 | A1 | * | 1/2007 | Chen ........................... | 290/55 |
| 2008/0048453 | A1 | * | 2/2008 | Amick ........................ | 290/44 |

FOREIGN PATENT DOCUMENTS

JP  05296137 A  * 11/1993

* cited by examiner

*Primary Examiner*—Joseph Waks
(74) *Attorney, Agent, or Firm*—Julio M. Loza; Loza & Loza, LLP

(57) ABSTRACT

An aircraft adapted to house a wind funnel and a wind turbine configured to convert the airflow through the wind funnel into electricity. An electrical cable between the aircraft and a ground station transfers the generated electricity from the aircraft to the receiving ground station for distribution. A plurality of aircraft according to certain embodiments may form a system for generating electricity from airflow.

6 Claims, 4 Drawing Sheets

FUNNELED WIND TURBINE AIRCRAFT

CLAIM OF PRIORITY

This is a non-provisional patent application which claims priority to Provisional Patent Application No. 60/939,604 filed May 22, 2007.

BACKGROUND OF INVENTION

1. Field

The invention relates to the field of wind-based energy generation and, in particular, to a high-altitude blimp having a funneled wind turbine that improves electricity generation.

2. Background

In recent years, environmentally friendly and cost-efficient energy sources have been explored to reduce dependence on fossil-based fuels. One such alternative energy source is wind-based electric energy. However, many wind-based energy generating systems (e.g., wind mills, etc.) fail to be cost-efficient.

U.S. Pat. No. 7,129,596 describes a hovering wind turbine in which structures with turbine blades are supported in the air by a plurality of blimps. This design fails to harness or concentrate wind power to efficiently generate electricity.

U.S. Pat. No. 4,166,596 describes a tethered wind generating aircraft in which fan blades turn pulleys coupled to a large "fan belt" that runs to a generator on the ground. This design is cumbersome in that the "fan belt" is run from the aircraft to ground. Consequently, such system may be difficult to implement in high-altitude applications.

Additionally, many prior art wind turbines devices are not optimized to take advantage of high-altitude wind currents which tend to be steadier and more powerful than low-altitude wind currents.

SUMMARY OF INVENTION

A wind-to-power generator aircraft comprising: a primary body filled with a lighter-than-air gas to provide buoyancy to the aircraft; a wind funnel coupled along a length of the primary body, a large end of the wind funnel located at a front of the aircraft and a small end of the wind funnel located approximately at a middle of the aircraft, the wind funnel positioned to concentrate airflow from the large end to the small end; a wind-to-electricity turbine coupled at the small end of the wind funnel wherein the turbine is ducted; and a tether coupled to the aircraft at a point near the turbine to secure the aircraft to the ground and transmit electricity from the turbine to a ground station is provided.

In some embodiments, the turbine may be adapted to convert the airflow into electricity. The aircraft of claim may further include a rudder coupled to the rear of the aircraft. The wind funnel of the aircraft may be coupled along a bottom portion of the primary body. The primary body may be made from a light weight material. The aircraft may further include a winch configured to adjust the altitude of the aircraft and align it with the airflow. The aircraft may further include a buoyancy controller configured to maintain the aircraft at a desired altitude. The aircraft of may further include a plurality of winches located at a front end and a rear end of the aircraft wherein the winches are tied to the tether and adapted to control pitch. The aircraft of may further include a supporting ring about the opening of the wind funnel and a plurality of ribs along the length of the wind funnel. In one embodiment, the primary body has a longitudinal blimp-like shape.

An aircraft including: a primary body filled with a lighter-than-air gas to provide buoyancy to the aircraft; a wind funnel defined within the primary body along a length of the primary body, a large end of the wind funnel located at a front of the aircraft and a small end of the wind funnel located approximately in the middle of the aircraft, the wind funnel positioned to concentrate airflow from the large end to the small end; a pivotless wind-to-electricity turbine coupled at the small end of the wind funnel wherein the turbine is ducted; and a tether coupled to the turbine to secure the aircraft to the ground and transmit electricity from the turbine to a ground station is provided.

In some embodiments, the turbine may be adapted to convert the airflow into electricity. Moreover, a rear end of the primary body opposite the large end of the wind funnel may be tapered and formed into a rudder. The tether may be secured to a winch on the ground wherein the winch is configured to adjust the altitude of the aircraft and align it with the airflow.

A system for generating electricity from airflow, including: a plurality of primary bodies filled with a lighter-than-air gas to provide buoyancy to each body; a wind funnel coupled along a length of each primary body, a large end of the wind funnel located at a front of each body and a small end of the wind funnel located approximately at a middle of each body, the wind funnel positioned to concentrate airflow from the large end to the small end; and a wind-to-electricity ducted turbine coupled at the small end of each wind funnel, wherein the plurality of primary bodies are connected together to form a truss is provided.

The system may further include a tether to secure the truss to the ground and transmit electricity therethrough. Each primary body may be spaced sufficiently away from one another to prevent combustion. The system may further include means to control the truss including, a winch, a power converters and a monitoring station. The altitude of each primary body may be controlled by an onboard computer and/or a wireless control system. A network system may coordinate each primary body such that the altitude of each primary body is coordinated relative to one another.

DETAILED DESCRIPTION OF THE INVENTION

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

One aspect of the present invention provides an aircraft adapted to house a wind funnel and a wind turbine configured to convert the airflow through the wind funnel into electricity. An electrical cable between the aircraft and a ground station transfers the generated electricity from the aircraft to the receiving ground station for distribution.

Figure 1:
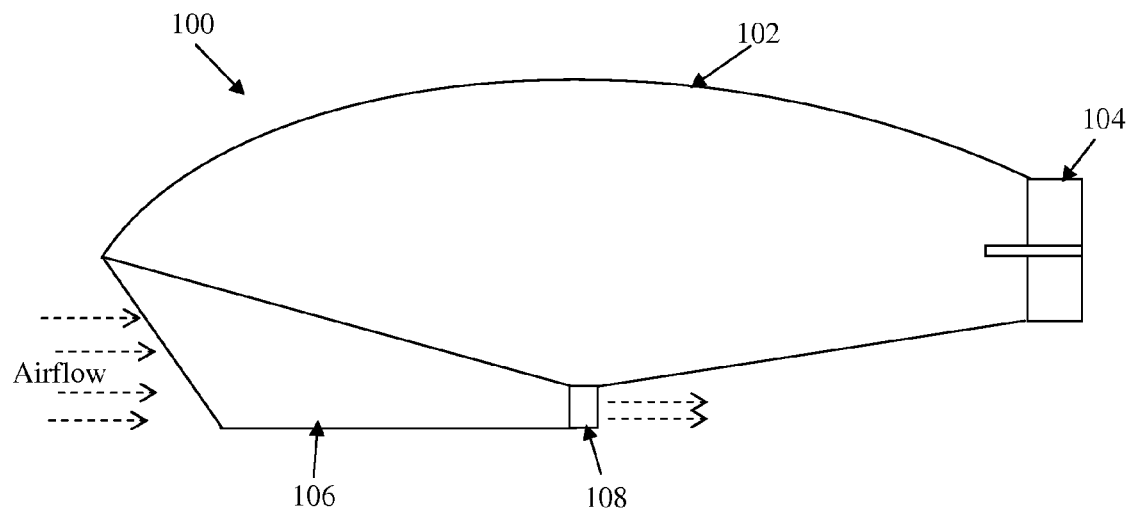
FIG. 1 illustrates a side view of an embodiment of an aircraft for converting air to electricity according to the invention.
Figure 2:
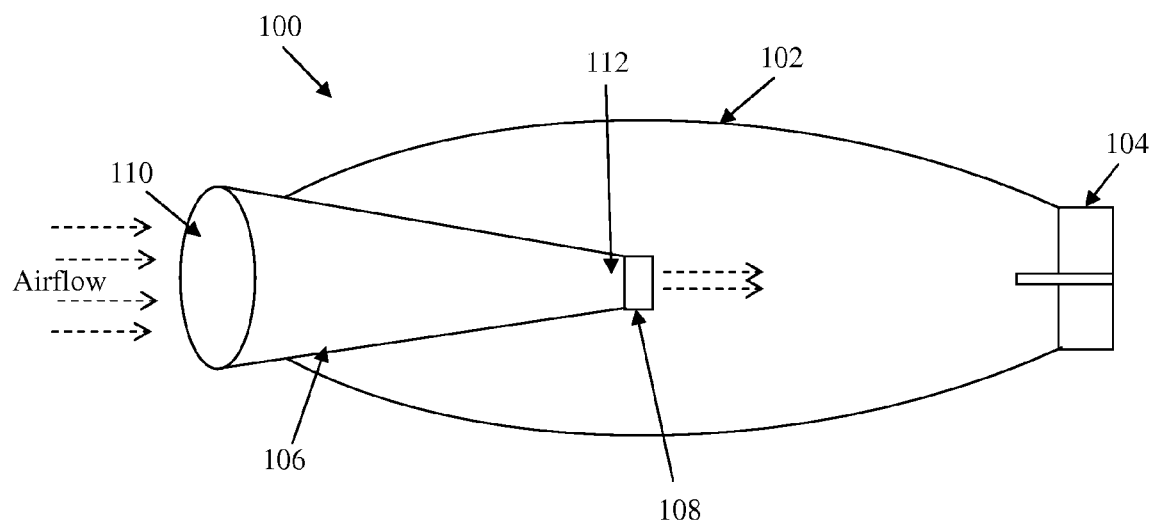
FIG. 2 illustrates a bottom view of the aircraft of FIG. 1
Figure 3:
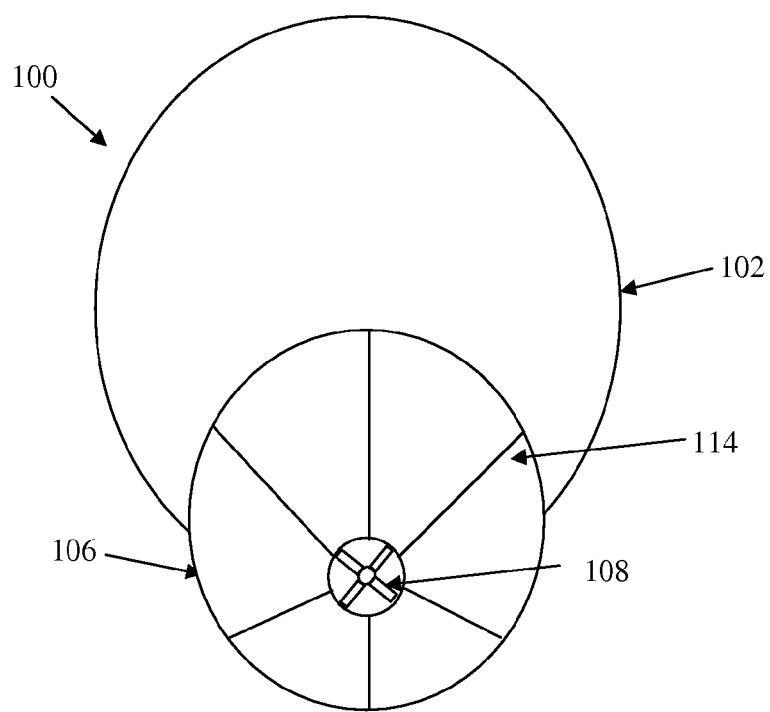
FIG. 3 illustrates a front view of the aircraft of FIG. 1.

FIGS. 1, 2, and 3 illustrate different views of an aircraft 100 (e.g., blimp) adapted to house a wind funnel turbine according to one embodiment. FIG. 1 illustrates a side view of an embodiment of an aircraft for converting air to electricity according to the invention. The aircraft 100 may include a primary buoyant body 102 that may be filled with a lighter-than-air gas to cause the aircraft to float in air. Different types of gases which have a density lower than air may be used to fill the primary buoyant body 102. An example of such a gas includes, but is not limited to, helium. A tail rudder and/or stabilizing guides 104 may be coupled at the rear of the aircraft 100. A funnel 106 may be coupled lengthwise along a bottom portion of the aircraft 100, with a large opening end 110 of the funnel 106 at the front of the aircraft 100 and a small opening end 112 of the funnel 106 pointed toward the rear of the aircraft 100 (see FIG. 2). In some embodiments, the small opening end 112 is situated approximately intermediate between the front end and the rear end of the aircraft 100. The funnel 106 may be made from a thin, light-weight material. An example of such material includes, but is not limited to, an aluminum and polyethylene film laminate. A turbine 108 (including blades and a generator) may be coupled to the small end 112 of the funnel 106 to convert air flowing through the funnel 106 from the large opening end 110 to the small opening end 112 into electricity. In some embodiments, the turbine 108 is ducted.

Figure 4:
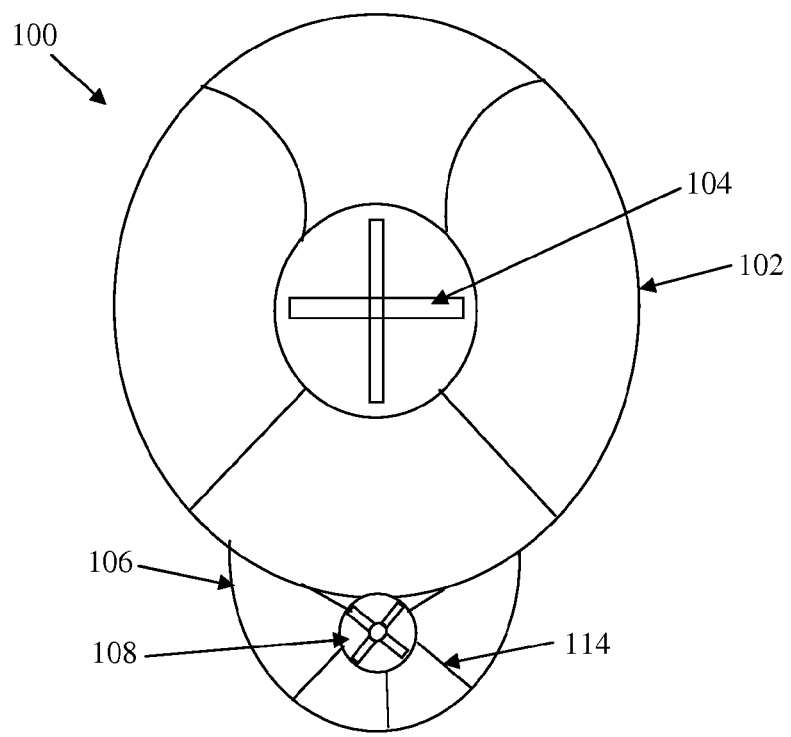
FIG. 4 illustrates a back view of the aircraft of FIG. 1.

FIG. 3 illustrates a front view of the aircraft 100 described with reference to FIG. 1. FIG. 4 illustrates a back view of the aircraft 100 described with reference to FIG. 1. As show, a plurality of ribs (or spars) 114 may be attached to or incorporated within the wind funnel 106. The ribs 114 may be positioned longitudinally relative to the wind funnel 106. In one aspect, the ribs 114 may provide a reinforcing function to stabilize the wind funnel 106. Additionally, a reinforcing ring (not shown) may be attached to or incorporated within a mouth of the wind funnel 106, preferably at the mouth of the large opening end 110. Such ring may additionally provide reinforcement to the wind funnel 106. Overall, however, few rigid structures exist on the aircraft 100.

Using the funnel 106 to concentrate airflow into the small end 112 provides several advantages and improvements over the prior art. One advantage is that the use of the wind funnel 106 provides a self-orientation feature to the aircraft 100. That is, having the large opening end 110 at the front of the aircraft 100 causes the aircraft 100 to orient (or align) itself with the flow of air. Furthermore, the aircraft 100 may be tethered to the ground so that it maintains a relatively fixed position, while allowing the aircraft 100 to be self-oriented. The aircraft 100 may be maintained at a high altitude (e.g., a thousand feet or more from ground or sea level) by its tether (not shown). The tether may serve as the conduit for transmitting the electricity generated by the turbine 108 from the turbine 108 to a receiving station located on the ground.

Another advantage in using the wind funnel 106 is that it allows for using lighter wind turbines so that the aircraft 100 can more easily lift while still profitably producing electricity. The funnel 106 allows reducing the size of the turbine blades required to power the generator thereby improving performance. Although other high altitude wind generators have been designed, their large blade size or the mechanism used to turn their generator make them ungainly and unfeasible. The funnel shape is used to increase and concentrate the force of the wind on the turbine blades of turbine 108 thus allowing for shorter, lighter blades. Use of the wind tunnel 106 concentrates airflow through the small opening 112 which allows for the use of smaller turbine blades. The funnel 106 also allows for increased performance at low wind speeds and because the turbine is ducted, the blades can be smaller and lighter allowing for a smaller aircraft size and increased efficiency. The funnel can be shaped with a circular or triangular throat and its longitudinal section can be straight or curved, depending upon specific aerodynamic efficiencies and structural considerations.

The turbine 108 is considerably lighter in weight (in relation to the prior art) by using ultra-light weight materials and eliminating several unneeded parts. For example, the turbine does not need a pivot mechanism because pivoting is done from the ground via a tether connection on the ground. Additionally, less gearing is used in the turbine 108 because the blades of the turbine 108 are capable of achieving higher blade speeds (i.e., from using the funnel 106) thereby resulting in a smaller and lighter gearbox for the turbine. Additionally, in contrast to the massive bearings required by larger prior art turbine blades, the smaller and lighter blades utilize smaller bearings to support them. The turbine 108 may be located near the center bottom of the aircraft 100.

Figure 5:
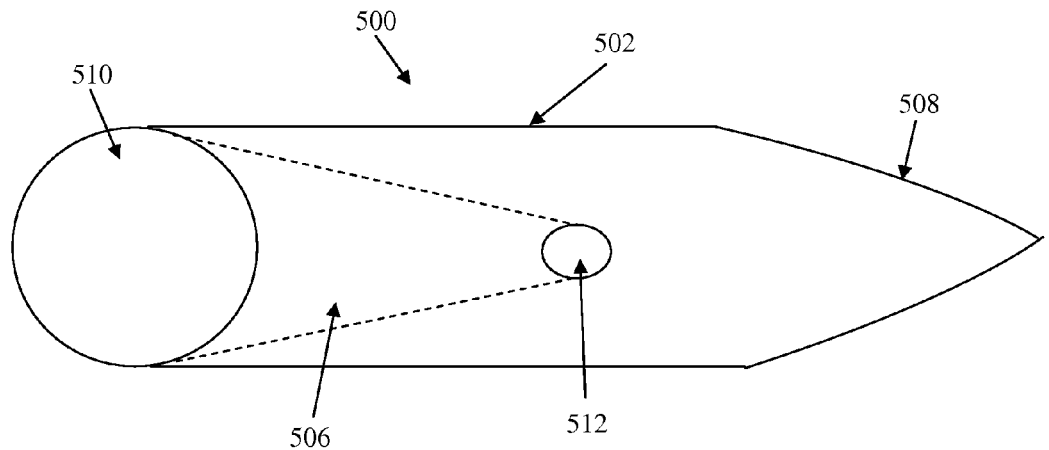
FIG. 5 illustrates a bottom view of a first alternative embodiment of an aircraft for converting air to electricity according to the invention.
Figure 6:
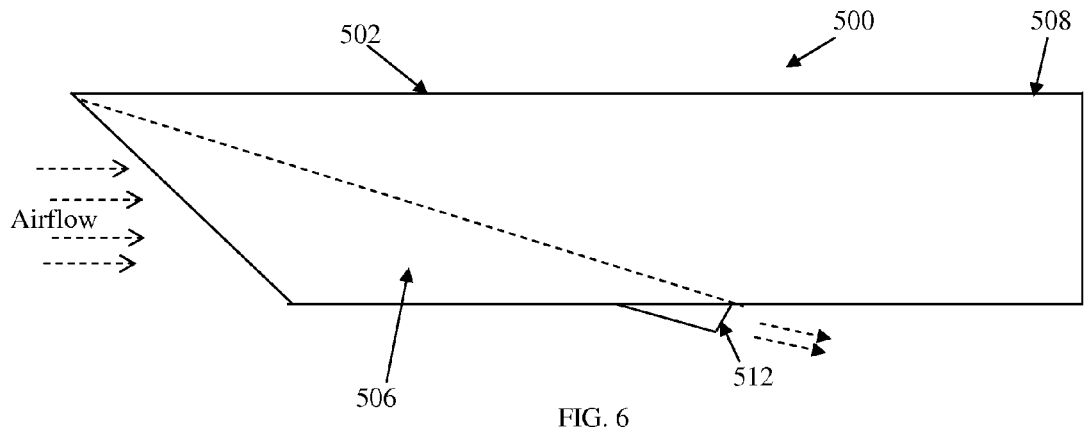
FIG. 6 illustrates a side view of the aircraft of FIG. 5.

FIGS. 5 and 6 illustrate an alternative embodiment of an aircraft 500 adapted to house a wind funnel according to one example. The aircraft 500 may include a round longitudinal body 502 with a large end opening 510 at one end and a tapered end 508 at the other end. The longitudinal body 502 may be filled with a lighter-than-air gas to provide buoyancy to the aircraft 500. The longitudinal body 502 may house a wind funnel 506 within the large end opening 510 at the front of the aircraft 500 and the small end opening 512 approximately midway along the longitudinal body 502 on the bottom side. Alternatively, the wind funnel 506 may be integral with the body 502. That is, the large end opening 510 and the small end opening 512 may themselves comprise a funnel chamber of the funnel 506. This configuration is intended to keep the center of mass balanced under the center of lift. The large opening 510 may be angled (as illustrated in FIG. 6) to increase the effective area through which air may enter. A turbine may be located at or near the small opening 512, so that it is turned by the force of the air being funneled out of the small end 512. As the airflow turns the turbine, it generates electricity which is then distributed to a ground station via an electrically conductive tether.

Figure 7:
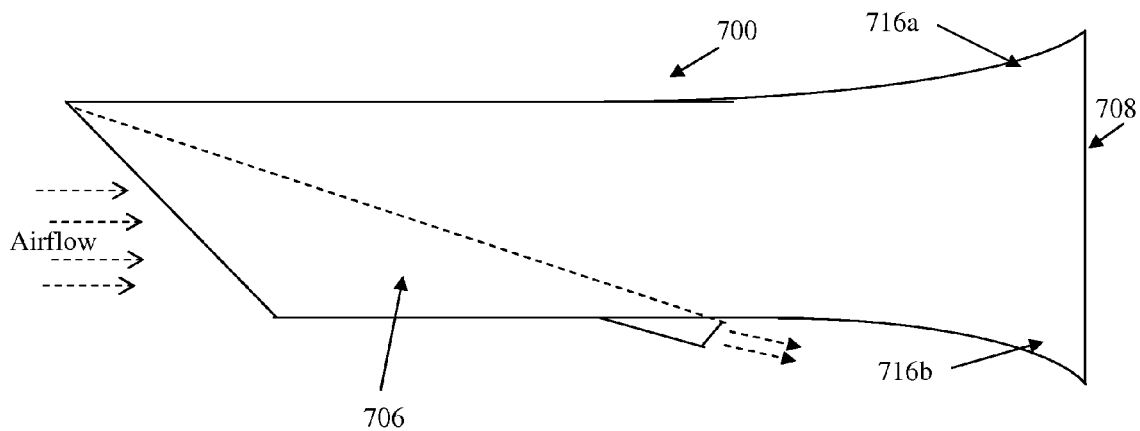
FIG. 7 illustrates a side view of a second alternative embodiment of an aircraft for converting air to electricity according to the invention.

FIG. 7 illustrates an alternative embodiment of the aircraft illustrated in FIGS. 5 and 6. In this example, the aircraft 700 also houses a wind funnel 706 which concentrates airflow from a large end to a small end to cause a turbine to convert wind force to electricity. The tail end 708 is tapered (as illustrated in FIG. 5) and guidance rudders 716a and 716b are formed thereon. In one example, the rudders 716a and 716b may be formed from the pinching of the tapered tail end 708.

Figure 8:
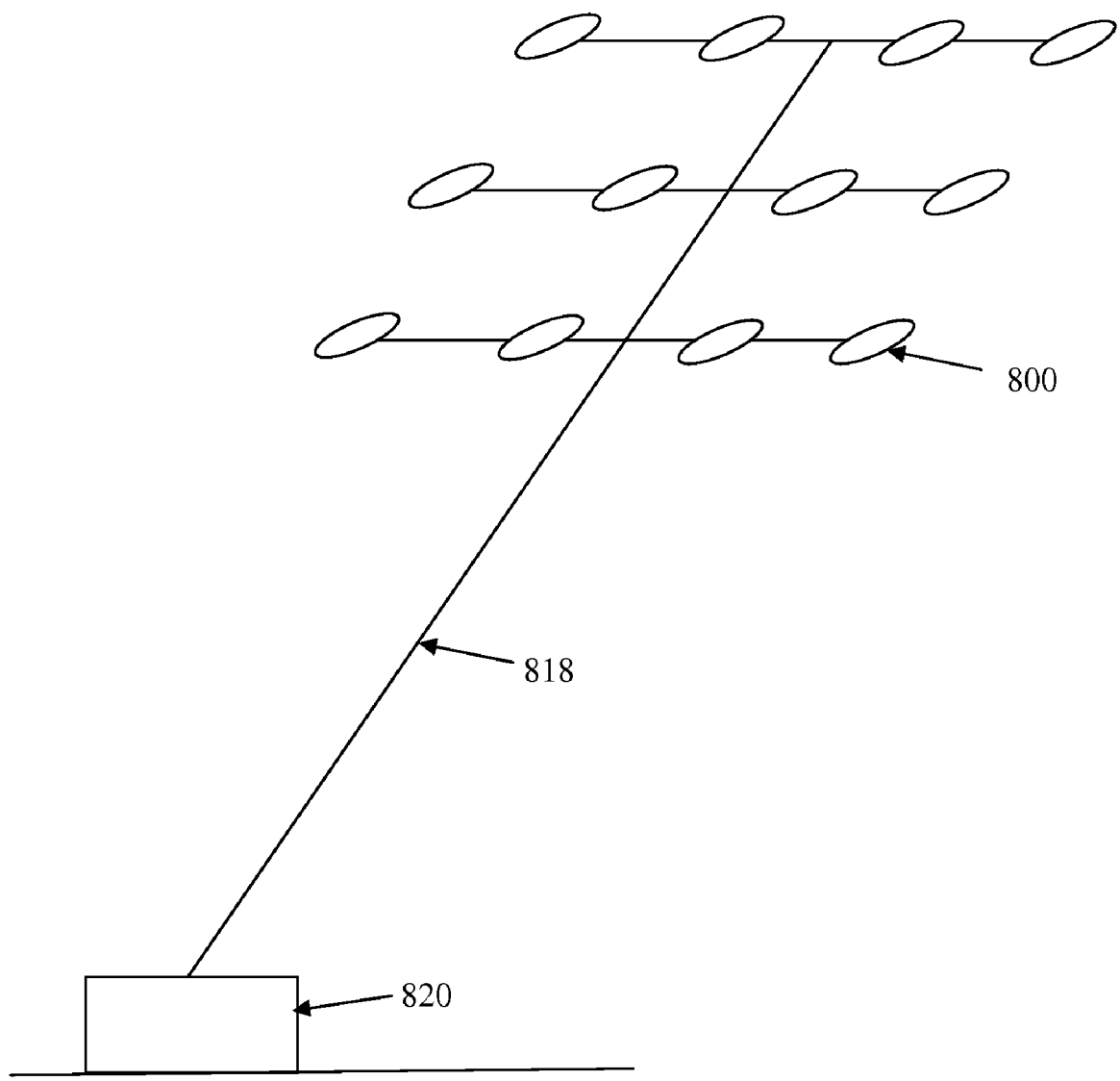
FIG. 8 illustrates a prospective view of a configuration of a plurality of aircrafts for converting air to electricity according to the invention.

In various configurations, the aircraft 100, 500 and/or 700 may be used as a sole power generator. However, other embodiments may implement a module of two, four, eight, or more aircraft 100 that may be stacked wherein one tether serves as the anchor to the ground and conduit of electricity generated by each of the turbines collected and passed therethrough. FIG. 8 illustrates an example of how a plurality of wind-to-power aircraft 800 may be arranged in groups and coupled to a single tether 818 that secures the aircraft 800 to a ground station 820. The aircraft 800 may be "stacked" up to an altitude where buoyancy and/or power generation are no longer efficient, possibly up to fifty thousand feet. The aircrafts 800 are stacked at a safe separation or distance from one another in case of combustion. Aircraft 800 may be paired so that their turbines and blades counter rotate. That is, by having the blades of a first aircraft rotate in a counter direction to the blades of a corresponding second aircraft, the whole set of aircraft may be prevented from turning.

Ground control may include a large winch, power converters/transformers and a monitoring station 820. The ground winch of this size may be designed in a plurality of configurations. In one implementation, the tether may be coiled around a very large drum such that the plurality of aircraft pivot together with the wind. In another implementation, the tether may be coiled into a large round "basket" wherein pivoting is limited to the pressure rollers (i.e., the pressure rollers maintain tension on the tether and provide gentle curves to coil the tether into the "basket"). The ground winch allows for controlling the altitude of the aircraft or aircrafts, e.g., raising and lowering of aircraft modules. Power may be transmitted down the tether wherein in the tether is (at least partly), or functions as, a coaxial wire. Due to the high altitude of these aircraft (e.g., 1000 feet, 5000 feet, 10000 feet, 20000 feet, 30000 feet, etc.), warning lights may be placed along the tether and/or aircraft.

An aircraft's directional altitude may also be controlled by small on-board winches that tie the blimp to the main tether. These winches may be located and attached to the fore and aft of the aircraft to control pitch. If a single aircraft is aloft, the main attachment point for the tether may be under the turbine 108 (FIG. 1). If two or more aircraft are aloft, then the main attachment point for the tether is at the middle of a truss, where the aircraft are coupled on either end of the truss. The truss then is perpendicular to the direction of the flow of wind. Additional pairs of aircraft can be attached with the tether connected to the middle of the truss. Altitude can also be controlled with the aircraft rudder and/or elevators 104. All altitude controls (rudder, elevator and fore/aft winches) may be coordinated and/or controlled with an onboard computer or a wireless (remote) control system. Where a plurality of aircraft are deployed (as illustrated in FIG. 8), their controls may be networked so that their altitude is coordinated. Buoyancy may be maintained by a small on-board helium or hydrogen generator and/or storage tank.

Other advantages of having such high altitude wind-to-power generators include that there are likely to be fewer bird strikes, they take up less land space (in comparison to windmills), wind speeds at high altitudes are greater and have less turbulence compared to lower altitude winds making the turbines more efficient and able to produce more electricity at a more consistent rate, all of which may allow for lower costs and greater profits.

The method of energy production according to the invention may be particularly useful at remote sites and/or for industries where electrical consumption is high. A large, centrally located factory may manufacture the modules and ship them overseas for minimal assembly, or, the modules may be floated into place from great distances, creating an instant power plant.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for generating electricity from airflow, comprising:
    a plurality of primary bodies filled with a lighter-than-air gas to provide buoyancy to each body;
    a wind funnel coupled along a length of each primary body, a large end of the wind funnel located at a front of each body and a small end of the wind funnel located approximately at a middle of each body, the wind funnel positioned to concentrate airflow from the large end to the small end; and
    a wind-to-electricity ducted turbine coupled at the small end of each wind funnel, wherein the plurality of primary bodies are connected together to form a truss.

2. The system of claim 1 further comprising a tether to secure the truss to the ground and transmit electricity therethrough.

3. The system of claim 1 wherein each primary body is spaced sufficiently away from one another to prevent combustion.

4. The system of claim 1 further comprising means to control the truss including, a winch, a power converters and a monitoring station.

5. The system of claim 1 wherein the altitude of each primary body is controlled by an onboard computer or a wireless control system.

6. The system of claim 1, wherein a network system coordinates each primary body such that the altitude of each primary body is coordinated relative to one another.

* * * * *